Figure 1:
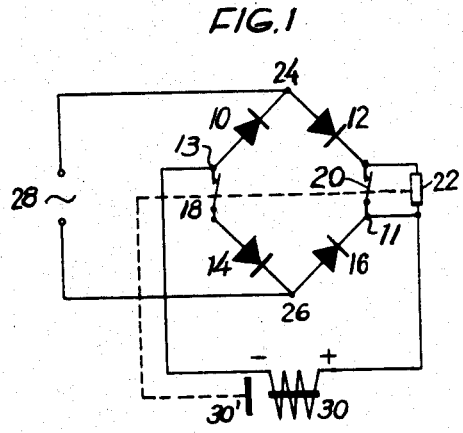

July 7, 1964

A. R. MAIS 3,140,429

CIRCUIT ARRANGEMENT FOR ENERGIZING
A DIRECT-CURRENT ELECTROMAGNET

Filed Feb. 10, 1961

ADOLF ROLF MAIS
INVENTOR.

BY *Karl F. Ross*

AGENT

United States Patent Office 3,140,429
Patented July 7, 1964

3,140,429
CIRCUIT ARRANGEMENT FOR ENERGIZING A DIRECT-CURRENT ELECTROMAGNET
Adolf Rolf Mais, Enskede, Sweden, assignor to Aktiebolaget Hagglund & Soner, Ornskoldsvik, Sweden, a corporation of Sweden
Filed Feb. 10, 1961, Ser. No. 88,389
Claims priority, application Sweden Feb. 12, 1960
2 Claims. (Cl. 317—154)

The present invention refers to a circuit arrangement comprising rectifiers for feeding a direct-current electromagnet system with attraction and holding current.

It is known that magnet systems fed by direct current have essential advantages compared with alternating-current magnet systems because the first type of magnet can be made of solid iron instead of laminated magnet cores which are necessary for alternating-current energization and which moreover are to be provided with induction and short-circuit rings, thereby resulting in constructive difficulties besides increased costs. Further drawbacks of alternating-current magnet systems are that the pole surfaces must be ground for attaining precise fit between the core parts in order to avoid air gaps as well as buzzing noise, that guiding of the movable laminated magnet armature involves special guide means, that the attraction effect and therefore the holding force will be greater than for direct-current magnet systems, and finally that the movement of the alternating-current magnet is staccato and takes place in an abrupt manner in contrast to the soft motion of a direct-current magnet which fact results in faster wear of those elements which are actuated by the alternating-current magnet sytsem.

In consequence of the above disadvantages of the alternating-current magnet, direct-current magnets will be used to that extent which is permitted by the circumstances. Direct-current magnets, however, if they are to be supplied from a source of alternating-current, in their turn have the disadvantage that particular rectifiers are needed, and that the attractive force between the stationary core and the movable armature will be least at the beginning of the working stroke but greatest at the end thereof; yet this relation should be inverted in an ideal magnet system because, for the holding of the movable armature in attracted position, only relatively little power is necessary, while the greatest power requirement is present at the beginning of the attraction movement.

The last mentioned disadvantage of direct-current magnet systems can be partly eliminated by series-connecting a resistance to the magnet winding after the movable armature has reached its holding position in such manner that the magnet winding can be rated both for a certain degree of overload and high input power during the working stroke and for a low holding-power input. However, this solution of the problem is accompanied by a new drawback, namely that the series-connected resistance will waste considerable energy and generate heat.

Efforts have been made to eliminate this drawback by first feeding the magnet system by means of a full-wave rectifier and then, the magnet having reached its attracted position, feeding the same by a half-wave rectifier; this method, however, has proved difficult to realize because the inductance of the magnet winding counteracts the pulsating half-wave voltage of the rectifier so that the holding current passing through the magnet winding will become too weak.

This disadvantage is eliminated in a device according to the invention mainly in that the rectifiers are arranged in a bridge connection whose direct-current output terminals are connected to adjoining rectifier arms, leading to different input terminals, via respective break contacts coupled with the movable armature of the controlled magnet system, one break contact being shunted by a resistance.

Figure 2:
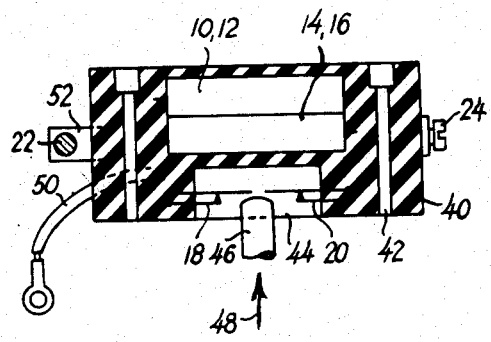

The invention is illustrated by way of example in the accompanying drawing, wherein:

FIGURE 1 is a circuit diagram for feeding a magnet system in accordance with this invention; and FIGURE 2 is a sectional view of a structural circuit element embodying the system of FIG. 1.

The circuit shown in FIG. 1 comprises four rectifiers 10, 12, 14, 16 in bridge connection whose two direct-current output terminals can be disconnected by means of break contacts 18, 20 which are coupled mechanically or in some other suitable manner to a movable armature 30' of an electromagnet 30. The first break contact 20 is shunted by a resistance 22. Both the alternating-current input terminals 24, 26 of the bridge circuit are connected to an alternating-current supply 28, while the junctions 11, 13 of the bridge circuit on the one side between rectifier 16 and break contact 20 and on the other side between rectifier 10 and break contact 18 are connected to opposite terminals of magnet winding 30.

The circuit operates as follows. When the magnet winding 30 is energized so that the armature 30' is moved towards the stationary magnet core, the bridge circuit functions as a normal full-wave rectifier, the exciting current having its maximum value for bringing about the needed attractive force between the stationary core and the movable armature magnet 30. However, immediately before the movable armature 30' has reached its final position in contact with the stationary core, both break contacts 18, 20 will be actuated and opened by, for instance, a mechanical coupling member provided on the armature 30'. At this moment the exciting current will be diminished and assumes its holding-current value which is sufficient for retaining the armature 30' attracted. Now the rectified current flows from the alternating-current supply 28 to input terminal 26, rectifier 16, output terminal 11, magnet winding 30, output terminal 13, rectifier 10 and input terminal 24 whence it returns to the supply 28, i.e. the rectifier circuit functions as a half-wave rectifier with its rectifier members 12 and 14 no longer operating. The magnet winding 30 therefore will be fed with substantially reduced power due partly to the half-wave rectifying effect and partly to the fact that an induction voltage of opposite polarity will arise at the terminals of the magnet winding 30 after each half-wave causing a further reduction of the exciting current. For eliminating this induction voltage the resistance 22 has been provided which closes the following circuit independent of source 28 for the induction current. From the negative (left-hand) pole of magnet winding 30, which represents the positive pole of the induction voltage, to output terminal 13, rectifier 10, rectifier 12, resistance 22 and back to the magnet winding 30. On account of the fact that the magnet winding now no longer functions as a passive element but now acts as an energy-delivering current supply which has an inverted polarity, the direction of the induction current will be like that of the pulsating exciting current of the alternating-current supply 28, i.e., the induction current will assist the exciting current and tend to maintain a continuous flow through the winding 30. This means in practice an important reduction of the energy requirement of the alternating-current supply for the holding current of said magnet winding. As an example it can be mentioned that a so-called economy resistance, which earlier had been inserted in the energizing circuit of the full-wave rectifier and consumed 12 watts of useless energy converted into troublesome heat, could be replaced by the resistance 22 of the present invention which consumes only 1 watt, thus involving an improvement in a relation of 12:1.

The device shown in FIG. 2 represents a practical embodiment of a suitable circuit arrangement. All components of the circuit according to the invention are placed, e.g., molded or imbedded, in a solid or hollow plastic body 40 which in convenient manner, e.g., by throughgoing screw holes 42, can be fastened on a given magnet system. The plastic body 40 envelops the rectifiers 10, 12 and 14, 16, the break contacts 18, 20 whose free ends extend into a recess 44 at the lower side of the body 40, as well as the lead wires of the circuit for connecting the components to one another. The break contacts 18, 20 are actuated by a rod 46 of insulating material secured to the movable armature 30' of the magnet system and guided to the contacts 18, 20 in the direction of an arrow 48; this rod is actuated just before the movable armature reaches its end position. At the exteriors of the body 40 there are arranged the terminal screws (e.g., 24) for the alternating current supply 28 of FIG. 1, flexible lead wires 50 (only one shown) for the magnet winding 30, and holding means consisting of tabs 52 anchored in the body 40 for receiving the resistance 22 shown in section.

I claim:

1. A circuit arrangement for energizing an electromagnet, comprising:
   a full-wave rectifier bridge provided with four rectifier arms, a pair of diagonally opposite input terminals connectable across a source of alternating current, and a pair of diagonally opposite output terminals connected across said electromagnet;
   a pair of break contacts respectively inserted in circuit with said output terminals and respective rectifier arms connected to different input terminals;
   means for opening both said break contacts upon energization of said electromagnet by the direct-current output of said bridge whereby a pulsating holding current for said electromagnet is caused to pass through two of said arms in series with said electromagnet; and
   resistance means shunting one of said break contacts and establishing a circuit independent of said source through one of the two last-mentioned arms and a third of said arms in series with said resistance means and said electromagnet for maintaining an inductive current flow therethrough between pulsations of said holding current.

2. An electromagnet control system comprising:
   an electromagnetic winding;
   a movable armature controlled by said winding;
   a full-wave rectifier bridge provided with four rectifier arms, a pair of diagonally opposite input terminals connectable across a source of alternating current, and a pair of diagonally opposite output terminals connected across said winding;
   a pair of break contacts respectively inserted in circuit with said output terminals and respective rectifier arms connected to different input terminals;
   means physically connected with said armature for opening both said break contacts upon energization of said winding by the direct-current output of said bridge whereby a pulsating holding current for said armature is caused to pass through two of said arms in series with said winding; and
   resistance means shunting one of said break contacts and establishing a circuit independent of said source through one of the two last-mentioned arms and a third of said arms in series with said resistance means and said winding for maintaining an inductive current flow therethrough between pulsations of said holding current.

References Cited in the file of this patent

FOREIGN PATENTS 548,445    Great Britain _____ Oct. 9, 1942